United States Patent [19]

Krasutsky et al.

[11] Patent Number: 4,615,587

[45] Date of Patent: Oct. 7, 1986

[54] HIGH SPEED ERASING AND REBIASING OF THERMOPTIC THIN FILMS

[75] Inventors: Nicholas J. Krasutsky, Carrollton; Mark E. Koch, Dallas, both of Tex.

[73] Assignee: LTV Aerospace and Defense Company, Dallas, Tex.

[21] Appl. No.: 455,968

[22] Filed: Jan. 6, 1983

[51] Int. Cl.[4] .............................................. G02F 1/01
[52] U.S. Cl. .................................................... 350/353
[58] Field of Search ........................................ 350/353

[56] References Cited

U.S. PATENT DOCUMENTS

| | | | |
|---|---|---|---|
| 3,484,722 | 12/1969 | Barker, Jr. et al. | 332/4 |
| 3,497,286 | 2/1970 | Morton et al. | 350/160 |
| 3,533,823 | 10/1970 | Newkirk et al. | 117/0.5 |
| 3,836,236 | 9/1974 | Kirk et al. | 350/310 |
| 3,986,768 | 10/1976 | Peters et al. | 350/310 |
| 4,082,413 | 4/1978 | Austin et al. | 350/1.1 |
| 4,099,853 | 7/1978 | Glickler et al. | 350/310 |
| 4,110,013 | 8/1978 | Eitel | 350/310 |
| 4,114,978 | 9/1978 | Bostick et al. | 350/1.7 |
| 4,236,156 | 11/1980 | Eden | 340/786 |
| 4,253,739 | 3/1981 | Carlson | 350/310 |
| 4,283,113 | 8/1981 | Eden | 350/96.15 |
| 4,314,742 | 2/1982 | Dye et al. | 350/310 |
| 4,442,429 | 4/1984 | Kotani et al. | 350/353 |

Primary Examiner—John K. Corbin
Assistant Examiner—Bruce S. Shapiro
Attorney, Agent, or Firm—J. M. Cate; S. S. Sadacca

[57] ABSTRACT

A method and apparatus for rapidly erasing and rebiasing a thermoptic thin film. A thermal insulating material (16) is disposed adjacent a thermoptic thin film (10). A layer of resistive material (14) is disposed between the insulating material and the thermoptic thin film and is connected to a current generator (18) which supplies a current to the layer dissipating heat into the thermoptic thin film and insulating layer. A thermal body (22), having high thermal conductivity and interfacing with the insulating layer the opposite boundary from the thermoptic thin film, contains a conduit through which a refrigerated liquid is flowed to establish a thermal gradient from the thermoptic thin film to the fluid. Sufficient current is supplied to the resistive layer to maintain the temperature of the thermoptic thin film at the bias temperature. A control circuit is provided for intermittently interrupting the current flow, causing heat to dissipate from the thermoptic thin film and the temperature to drop to a point below the hysteresis loop, whereby images written in the thermoptic thin film are erased. A sensor (28) may be provided adjacent the thermoptic thin film for generating a temperature signal corresponding to the temperature of the film. The signal is fed back to the control circuit. When the temperature of the film drops below 45° C. and the film is erased, sufficient current is then furnished to the resistive layer to cause the temperature of the film to increase to the bias temperature.

27 Claims, 6 Drawing Figures

HIGH SPEED ERASING AND REBIASING OF THERMOPTIC THIN FILMS

TECHNICAL FIELD

The invention pertains to thermoptic thin films generally and more particularly to erasure and rebiasing of thermoptic thin films.

BACKGROUND ART

Thermoptic materials exhibit changes in physical properties such as electrical conductivity, absorption, reflectivity and refractive index as the result of state changes between the semiconductor and metal states. Thermoptic materials, such as vanadium and titanium oxides, have relatively low absorption in the semiconductor state and high absorption and high reflectance in the metal state.

Thermoptic materials which exhibit metal-semiconductor phase transitions have a reflectance which is temperature sensitive. In thin films of thermoptic materials, there is a transition temperature below which the film behaves as a semiconductor and above which it behaves as a metal. Above the transition temperature of the thin film, the reflectance of the thermoptic material increases abruptly. It is well known that images can be recorded in thin films of thermoptic material at extremely high speeds by selectively heating a region of the film with a laser or electron beam. As long as the ambient temperature of the film is maintained at a suitable bias temperature inside the hysteresis loop, these images will be stored in the film. Normally, such images are erased by allowing the entire film to cool from its bias temperature down to some temperature well below the hysteresis loop.

This radiative cooling, however, is extremely slow and impractical. More direct means, such as those disclosed in U.S. Pat. No. 4,283,113 to Eden, have also been employed for cooling these films, such as direct cooling with thermoelectric junctions. U.S. Pat. No. 4,236,156 to Eden discloses a method for erasing thermoptic film displays by generating a high frequency surface acoustic wave on a piezeoelectric substrate on which a thermoptic film is employed. Another technique was to erase the film using a short burst spray of liquid refrigerant to cool the film below its hysteresis loop in a few milliseconds. However, the prior art techniques for erasing the rebiasing thermoptic films are neither fast enough nor practical in many applications. For example, in dynamic infrared scene simulation, where a laser or electron beam is used to write scene information on the thermoptic modulator, cycling requirements may require writing and erasing a scene at speeds as high as about 20 milliseconds per cycle. Since prior art erasing techniques are too slow and require complex and expensive apparatus, a faster method and simple apparatus are needed for erasing and rebiasing thermoptic thin film modulators.

DISCLOSURE OF THE INVENTION

This specification discloses a method and apparatus for rapidly erasing and rebiasing a thermoptic thin film modulator.

According to one aspect of the present invention, heat is dissipated from a thermoptic modulator thin film across a layer of thermal gradient material, such as quartz, which is cooled by flowing a refrigerated liquid adjacent the thermal gradient material. Heat is dissipated into the thermoptic thin film and the thermal gradient material by inducing an electric current in a resistive layer disposed therebetween at a rate necessary to maintain the thermoptic thin film at a bias temperature. When the film is to be erased, the current is switched off, thereby allowing heat in the thermoptic film to dissipate and the temperature of the film to drop to an erase temperature below the hysteresis loop. A current may be selectively applied to raise the temperature of the film to its rebias temperature.

According to another aspect of the present invention, a thermoptic thin film is disposed adjacent a resistive element adapted to dissipate heat when a current is applied thereto. A layer of thermal gradient material for dissipating heat from the thin film is supported by a thermal body containing a refrigerated liquid flowing therethrough. When current is applied to the resistive element, the thermoptic film is maintained at the bias temperature by Joule heating. When the flow current is interrupted, the heat in the thermoptic film is rapidly dissipated through the thermal gradient material and the temperature of the thermoptic film drops below the hysteresis loop, erasing the film. When the current is again applied, the thermoptic film is reheated up to the bias temperature and the film is conditioned for rewriting.

BRIEF DESCRIPTION OF THE DRAWINGS

A more complete understanding of the present invention can be had by reference to the following Detailed Description in conjunction with the accompanying Drawings, wherein.

DETAILED DESCRIPTION

Materials which exhibit marked changes in optical properties with changes in temperature are known as thermoptic materials. Compounds, such as certain terenary halides, terenary monochalcogenides and certain transition metal oxides, such as vanadium oxides and titanium oxides, exhibit these properties.

As the result of thermodynamic phase transitions from the semicondutor to metal states, certain vanadium oxides and titanium oxides undergo marked changes in physical properties such as reflectance, electrical conductivity and refractive index. In thin films of such materials, hysteresis effects are observed in the physical properties analogous to the ferromagnetic "memory" effects observed in certain ferromagnetic materials. These particular thermoptic materials have important applications in information displays and storage, as well as as in the modulation of optical signals.

The thermoptic properties of these vanadium oxides and titanium oxides are usually exploited by making thin films of these materials containing large numbers of crystallites by conventional processes such as by vacuum deposition. These thin films of thermoptic material normally contain vanadium dioxide, but may also include titanium oxides ($Ti_4O_7$) or any of the other vanadium oxides, vanadium sesquioxide ($V_2O_3$) and vanadium oxide ($V_3O_5$).

These state transitions for vanadium dioxide thin films are thermodynamically reversible. When the temperature of the film in the reflecting or metal state is decreased, the film returns to its transparent or semiconductor state. Because the transition between successive states can be fairly rapid, less than one-half millisecond, it is appropriate to speak of "switching" these films from one state to another.

Figure 1:
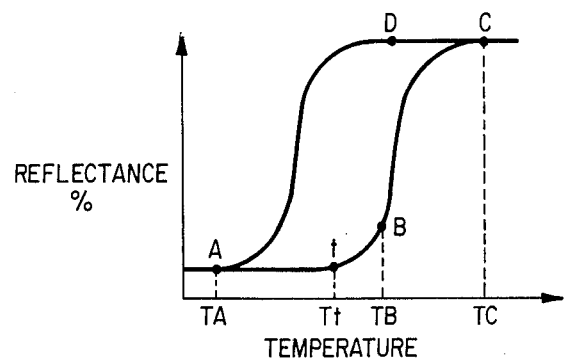
FIG. 1 is a graphical representation of the reflectance of thermoptic thin film as a function of temperature, illustrating the hysteresis effects and phase transition.

In applications such as modulation of light in infrared scene simulation, reflectance is the physical property of primary interest. FIG. 1 graphically illustrates the reflectance of a thin film of vanadium dioxide, one member of this class of materials, as a function of temperature. Although all members of the class exhibit similar optical properties at different transition temperatures, vanadium dioxide is the most practical in most applications because its transition temperature is approximately 65° C. Other thermoptic materials, which have relatively high or low transition temperatures, are practical only in special applications, such as, for example, in high and low temperature environments.

Referring to FIG. 1, point A on the curve represents the reflectance of a thin film of vanadium dioxide which is initially at a temperature well below the transition temperature, $T_t$ of the film. If the film is heated by application of thermal energy to some temperature $T_B$, the reflectance of the film will gradually increase to a point B on the curve. As the temperature exceeds the transition $T_t$, which for vanadium oxide thin films is approximately 65° C., the reflectance will rapidly increase as the film is switched to its metal state. When the transition temperature of the film is greatly exceeded by some temperature $T_C$, the film will have relatively high reflectance, as indicated by points C on the curve. When the temperature of the film is lowered, such as by ordinary radiative cooling following heating, the film exhibits a reflectance shown by the upper portion of the curve in FIG. 1. As the film is cooled from temperature $T_C$ back to the ambient temperature $T_B$, the material retains its relatively high reflectance as shown by point D on the upper portion of the reflectance curve. The film is thus bistable for certain temperatures within the hysteresis loop, having two markedly different values of reflectance depending upon the thermal history of the material. To reduce the reflectance of the film back to that of the surrounding area, the temperature of the region must be lowered at some point below the hysteresis loop, such as to erase temperature $T_A$, which corresponds to a point A of lower reflectance on the curve. Once the erased temperature $T_A$ is reached, the film may then be rebiased by reheating the film above the transition temperature $T_t$, such as $T_B$, where the film will exhibit a reflectance shown by point B on the curve.

The present invention provides a method and apparatus for erasing and reestablising the bias temperature, $T_B$ of the thermoptic modulator which is particularly useful in an infrared background reflectance simulator. In such applications, a stored scene can be created on a vanadium dioxide modulator by scanning a visible laser beam modulator with a source of scan data in a two dimensional raster scan pattern across the $VO_2$ thin film, while the film is thermally biased in its hysteresis loop. The scene is projected onto a sensor by placing the modulator between an infrared source and a system of projecting optics. To change the scene, the modulator is cooled below the hysteresis loop and reheated (rebiased) to the bias temperature. New scene data is then written into the modulator by the laser or electron beam. Dynamic scene projection is accomplished by using this erase/rebias system together with an optical framing switch to yield a flicker free output. A simulator running at 100 hertz framing rate and utilizing two $VO_2$ modulators is fully cycled every 20 milliseconds. Modulators are maintained at bias temperature for 14 milliseconds (3 milliseconds for writing on the film, 9 milliseconds for projection and 2 milliseconds for switching screens). This leaves 6 milliseconds for the erase and rebias functions. Dynamic checks for rebiased temperature and reflectivity, if needed, should be made during this time period. The available time can be divided as needed between the erase and rebias functions.

In the present invention, the heat flux input from a resistive heater layer placed in close proximity to the $VO_2$ thin film is balanced against a cooling heat flux through a thermal insulator to a high power dissipation heat sink. The $VO_2$ thin film is maintained at its bias temperature, nominally within the range 58° to 68° C. by the balanced heat fluxes. When the input heat flux from the resistive heater layer is interrupted by switching off the current to the resistive heater layer, the $VO_2$ thin film is rapidly cooled below its hysteresis loop as the result of a thermal gradient across the insulator. After erasure, the film is rebiased by repowering the heater layer.

Figure 2:
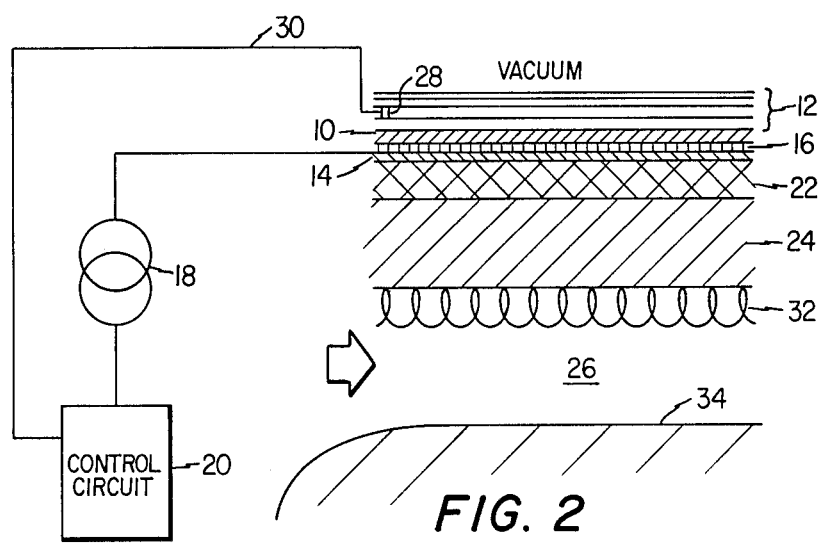
FIG. 2 illustrates a thermoptic modulator and the erasing/rebiasing apparatus in cross section.

FIG. 2 illustrates a $VO_2$ thin film disposed on an erase/rebias apparatus, adapted to erase and rebias the $VO_2$ thin film at high speeds. The $VO_2$ thin film 10, maintained in a vacuum, is overlaid with a multilayer reflective film stack 12, having thicknesses and optical characteristics chosen to obtain particular reflective/nonreflective characteristics for the particular wavelength of interest. A thin metal layer 14 is disposed beneath the $VO_2$ thin film 10 with a thin layer of electrical insulator material 16 sandwiched between the thin film 10 and the metal layer 14 to prevent current flow into the film. Layer 16 is designed to satisfy the optical requirements of the particular application, and may be composed of several thin film layers. A current generator 18, activated and controlled by a control circuit 20, supplies a variable current to layer 14 in which heat is generated by Joule heating.

Metal layer 14 is bounded on the opposite side by an isotropic thermal gradient layer 22. Thermal layer 22 is retained on a metal support plate 24, the opposite interface of which is in contact with a flowing refrigerated liquid 26.

When the $VO_2$ film 10 is to be held at its bias temperature $T_B$ (FIG. 1), a large current is continuously passed through the metal layer 14. The Joule heat generated in this film is carried away by the large temperature difference between the metal layer 14 and the coolant flowing beneath the metal support plate 24. As long as the current flows, the $VO_2$ film 10 will be maintained at essentially the same temperature as the metallic layer, nominally 65° C., which is the bias temperature of the $VO_2$ film. Any temperature gradient in the multilayer film stack 12 will be insignificant in a vacuum environment. Thus, the primary thermal gradient will be established through the thermal gradient layer whose thicknesses and thermal conductivity are chosen for a desired heat flow per unit area.

The bias temperature is thus maintained in the film 10 by a balance between the heat production in the metal layer 14 and the heat loss in the direction of the coolant. Erasure occurs by interrupting the current flow to the metal layer, which creates a large temperature differential between the thin film and the coolant, causing continuous flow of heat to the coolant. When the VO$_2$ thin film is cooled to an erase temperature, such as T$_A$ (FIG. 1), well below the hysteresis loop, the current is again turned on and the film is reheated to the bias temperature T$_B$. The film at this point then has a background reflectance t, as shown in FIG. 1, and is rebiased for writing.

The current wave form used during the rebias procedure can be tailored to establish rapid rebiasing with limited overshoot. Slight temperature drifts can be quickly compensated by providing a small temperature or optical detector 28 in or adjacent the film stack connected to a feedback loop 30 to the control circuit 20. Detector 28 may be used to detect temperature changes, or changes in reflectance or transmittance. Detector 28 is used to determine when the erase is complete, to maintain rebias feedback and to check gray scale writing. Unlike prior art rebias methods, bias corrections can be applied while the film is being written on or projected. Alternatively, detector 28 can be an optical sensor positioned some distance from the film stack, adapted to measure changes in reflectance indicative of temperature changes.

A variety of materials may be used for the thermal gradient layer 22, the metal support plate 24 and the refrigerated liquid 26 to achieve the desired heat flux. Quartz is an exemplary choice for the thermal gradient layer because of its low thermal conductivity. Copper is suitable for the support plate because of its high thermal conductivity and strength; and methanol is a suitable choice of coolant for many applications. It will be understood, of course, that other choices of materials may be appropriate, depending upon the desired flow rate and optical properties. The cooling heat flux can be further increased by creation of a turbulent flow along metal support plate 24 by a base metal on bonded mesh interface 32, or by other methods of creating turbulent flow in the cooling channel 34, as described below in greater detail.

Figure 3:
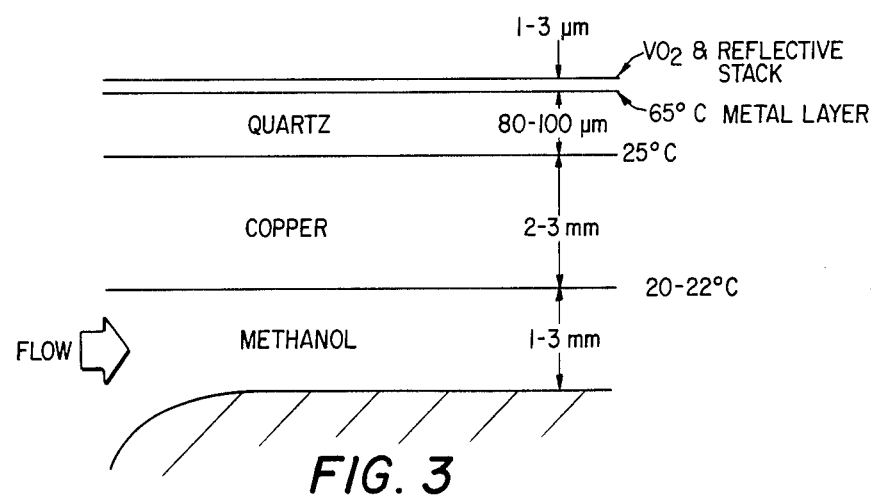
FIG. 3 illustrates the temperature profile and thicknesses for an exemplary choice of materials for the apparatus shown in FIG. 2.

FIG. 3 schematically illustrates such a choice of materials with relative thicknesses of materials and the approximate temperature profile for the indicated thicknesses. For a steady state case where the film is being written on and projected, metal layer 14 in film 10 must be maintained at 65° C. If the temperature of the quartz-copper interface is 25° C., the heat flow rate will determine the thickness of the quartz layer. For a 100 W/cm$^2$ flow, a gradient thickness of 64 microns is required, while a 56 W/cm$^2$ flow rate requires a quartz thickness of 100 microns. The temperature difference across the copper plate will be small for these flow rates. A two millimeter thick copper plate, for example, will create about a 5° C. drop for a flow rate of 100 W/cm$^2$ or a 2.8° C. drop for 56 W/cm$^2$ flow.

When the current to metal layer 14 is interrupted, heat will flow from the VO$_2$ film initially at a rate of 50-100 W/cm$^2$. This heat flow will diminish as the VO$_2$ thin film and the upper portion of the metal layer cool. This flow must both cool the VO$_2$ film, and thermal gradient layer and switch the VO$_2$ thin film. It might appear that the major portion of the energy (and largest time) is needed to switch the VO$_2$ thin film and cool the VO$_2$ and metal film. However, if the initial heat flow rate can be maintained, the upper film layers, including the 400 nm VO$_2$ film, can be cooled in less than 500 microseconds even for a 56 W/cm$^2$ flow. The major time delay actually occurs in cooling the quartz layer to establish an upper surface temperature of 45° C. since this layer is much more massive than the upper thin film layers.

Generally speaking, the problem of finding the temperature at any point in a semi-infinite isotropic layer in which one end is insulated and the other is held at constant temperature (T$_C$) is given by the following equation:

$$T(t,x) = T_c + \frac{2}{l} \sum_{h=0}^{\infty} e^{-k(2n + 1)^2 \pi^2 t/4l^2} \left( \cos \frac{(2n + 1)}{2l} \pi x \right)$$

$$\left\{ \frac{2l(-1)^{n+1} T_c}{(2n + 1)\pi} + \int_0^l (f,x') \cos \frac{(2n + 1)}{2} \pi x' dx' \right\}$$

where k is the diffusivity, t is the time, and x is the position relative to the high temperature side, is the layer thickness of the thermal gradient and f(x) is the temperature distribution in the layer at t=0, i.e., $$f(x) = T_H - \frac{Q}{k} x.$$

The heat flow Q is the power flow, T$_H$ is the initial high temperature and k is the thermal conductivity.

Figure 4:
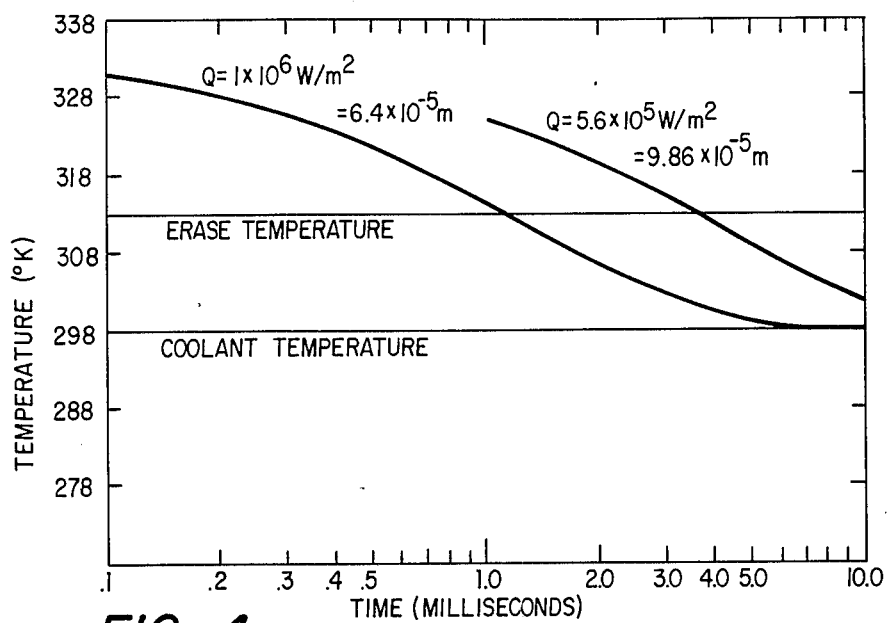
FIG. 4 is a graphical representation of the surface temperature of the quartz layer as a function of time for different heat flow rates.

FIG. 4 illustrates the temperature drop of the quartz layer (taken at the upper surface) as a function of time at both the 56 W/cm$^2$ flow rate and a 100 W/cm$^2$ flow rate. The 100 W/cm$^2$ flow is achieved with a thermal gradient thickness of about 6.4×10$^{-5}$m; the 56 W/cm$^2$ flow with a thermal gradient thickness of about 9.86×10$^{-5}$m. The 100 W/cm$^2$ rate shows a response time of about 1 microsecond, which is more than adequate for the cooling cycle necessary for dynamic infrared scene simulation. The 56 W/cm$^2$ rate shows cooling time of 3.5 microseconds. The 56 W/cm$^2$ cooling rate is easy to reach using a simple methanol flow on a copper holder. With only a few modifications, disclosed below, a 100 W/cm$^2$ rate can be achieved.

The amount of heat which can be removed from the surface of the smooth conductor by a liquid flowing across it is a function of the surface material, the liquid, the flow rate and the temperature difference between the liquid and the conductor surface. For the arrangement shown in FIG. 3, the rate of cooling by the liquid is given by ΔTh where:

$$\bar{h} = 572 \frac{k}{x'} \left[ \frac{V_o}{20 fps} \cdot \frac{x}{.167 \text{ ft}} \cdot \frac{1.93 \times 10^{-5}}{v} \right]^{0.8} pr^{\frac{1}{3}}$$

k=thermal conductivity (W/cm° K.), V$_o$ equals the flow rate in ft/sec, X is the length of the channel, v is the kinematic viscosity in ft$^2$/sec and PR is the Prandtl number. For the case of methanol, PR=15.3; v=0.0016; K=0.00202. With a flow of 20 ft/sec and a temperature difference of 50° C., the cooling rate is 56

W/cm²; with a flow rate of a 30 ft/sec and a temperature difference of 70°, the cooling rate is 117 W/cm².

Figure 5A:
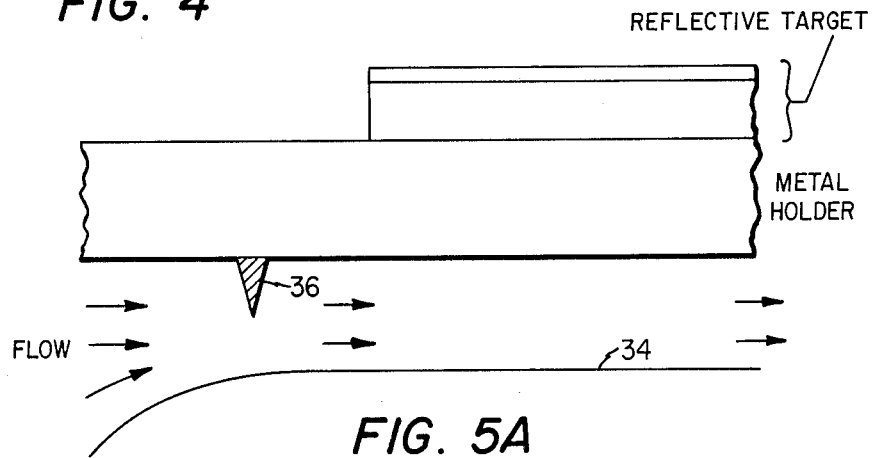
FIGS. 5A and 5B schematically illustrate the construction of a conduit and the flow characteristics of the coolant in alternate embodiments of the invention.
Figure 5B:
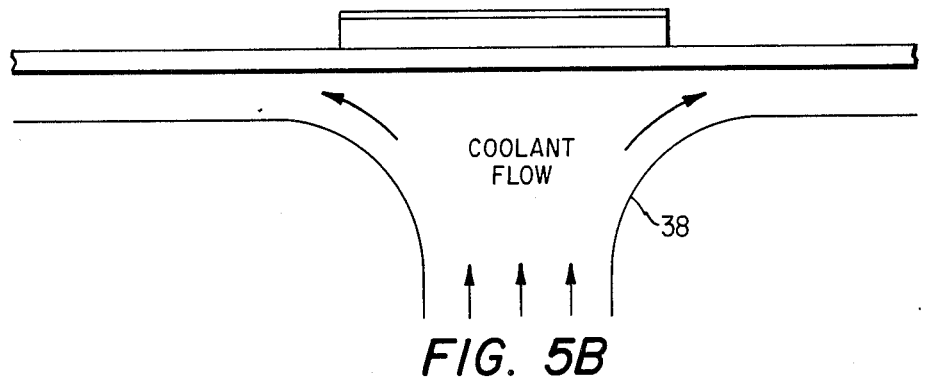

A number of changes can be implemented to raise the cooling heat flux. A structure of small dykes or a knife edge 36 can be added to the leading side of the cooling channel 34 as shown in FIG. 5A. This structure creates turbulent flow beneath the copper plate and increases the cooling rate by a factor from 2-4. As best seen in FIG. 5B, flowing the liquid at right angles to the plate through a channel configuration 38 will increase the cooling rate by about 40%. If a mesh 32 is bonded to the inner surface of the metal plate as shown in FIG. 2, the effective surface area is enlarged and the cooling rate is further increased. Liquid metals could also be used for cooling. For example, mercury will have a heat flow rate of 471 W/cm² with a temperature difference of 20° C.

Although a single embodiment of the invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

We claim:

1. A method for erasing images written on a thermoptic thin film comprising the steps of:
    (a) continuously extracting heat from said thermoptic thin film across a thermal gradient layer by flowing a refrigerated fluid adjacent said thermal gradient layer diametrically opposite said thermoptic thin film to establish a temperature gradient across said thermal gradient layer;
    (b) inducing an external heat flow into both said thermoptic thin film and said thermal gradient layer at a rate sufficient to furnish said heat being extracted and to maintain the internal temperature of said thin film at its bias temperature by flowing an electric current through a layer of resistive material disposed between said thermoptic thin film and said thermal gradient layer; and
    (c) interrupting said external heat flow into said thin film, thereby causing the temperature of said thermoptic thin film to drop from said bias temperature to a temperature below the hysteresis loop of said thermoptic film such that said thermoptic film is completely erased.

2. The method of claim 1 further comprising the step of:
    (d) reapplying said external heat flow into said thermoptic film and into said thermal layer by flowing an electric current through said layer of resistive material opposite said thermoptic thin film, causing the temperature of said thermoptic thin film to increase to the bias temperature, whereby the film is rebiased for writing.

3. The method of claim 1 further comprising the step of:
    (e) sensing the temperature of said thermoptic thin film and regulating said electric current and said external heat flow to maintain said bias temperature upon biasing and reapplying said external heat flow when the temperature for erasure is achieved.

4. The method of claim 3 wherein the step of sensing comprises disposing a temperature sensing element on the surface of said thermoptic thin film and generating a signal indicative of the temperature of said thermoptic thin film.

5. A method for biasing and erasing a thermoptic thin film comprising the steps of:
    (1) continuously extracting heat from said thermoptic thin film through a low thermal conductively insulating layer by flowing a refrigerated fluid adjacent a thermal gradient layer diametrically opposite said thermoptic thin film;
    (2) inducing an external heat flow into said thermoptic thin film effective to maintain said film at a bias temperature and to supply said heat being extracted through said low conductivity layer by flowing an electric current through a layer of resistive material disposed between said thermoptic thin film and said gradient layer; and
    (3) regulating said electric current in said resistive layer and said external heat flow to interrupt the external heat flow into said thermoptic film, thereby causing the temperature of said film to drop to a temperature effective to erase said thin film and to selectively increase the internal temperature of said thermoptic thin film to the bias temperature effective for writing on said thermoptic thin film.

6. The method of claim 5 wherein the step of regulating comprises the steps of:
    sensing the temperature of said thermoptic thin film;
    generating a feedback signal indicative of the temperature sensed; and
    applying said feedback signal to a control circuit, said control circuit controlling the electric current into said resistive layer and the external heat flow in response to said signal and the desired temperature.

7. The method of claim 5 wherein the step of regulating comprises the steps of:
    sensing the reflectance of said thermoptic thin film;
    generating a feedback signal indicative of the reflectance sensed; and
    applying said feedback signal to a control circuit, said control circuit controlling the electric current into said resistive layer and the external heat flow in response to said signal and the desired reflectance.

8. The method of claim 5 wherein the step of regulating comprises the steps of:
    sensing the transmittance of said thermoptic thin film;
    generating a feedback signal indicative of the transmittance sensed; and
    applying said feedback signal to a control circuit, said control circuit controlling the electric current into said resistive layer and the external heat flow in response to said signal and the desired transmittance.

9. A method for erasing and rebiasing of vanadium dioxide thin film having a bias temperature of about 65° C. and exhibiting hysteretic optical properties above the temperature of about 45° C., comprising the steps of:
    (a) continuously flowing a refrigerated fluid along one boundary of a low thermal conductively gradient layer, the opposite boundary of which is disposed adjacent said vanadium dioxide thin film to establish a thermal gradient across said thermal gradient layer in the direction of said fluid to continuously extract heat from said thermal gradient layer and from said vanadium dioxide thin film;
    (b) applying a current to a layer of resistive material disposed between said vanadium dioxide thin film and the boundary of said thermal gradient material to heat both said vanadium dioxide thin film and said thermal gradient layer at a rate sufficient to maintain said vanadium dioxide thin film at a temperature of about 65° C.;

(c) periodically interrupting the current applied in step (b) for a sufficient period of time to allow heat in said vanadium dioxide thin film to be dissipated through said thermal gradient layer and the temperature of said thin film to drop to a temperature less than about 45° C., whereby images in the vanadium dioxide thin film are erased;

(d) sensing the temperature of said vanadium dioxide thin film and generating a signal corresponding to said temperature;

(e) regulating the current applied to said resistive layer in step (b) in response to the signal generated in step (d), when the film temperature sensed in step (d) is less than or about 45° C. to increase the temperature of said vanadium dioxide thin film to about 65° C., whereby said film is rebiased for writing images; and (f) repeating steps (a)–(e).

10. The method of claim 9 wherein steps (a)–(e) are repeated at least every 20 milliseconds.

11. The method of claim 9 wherein the current is interrupted in step (c) for no more than about 1–3 milliseconds.

12. The method of claim 9 wherein the current is applied in step (b) for a period no more than about 3 milliseconds.

13. The method of claim 9 wherein heat is dissipated in step (a) at a rate from about 50 W/cm$^2$ to about 100 W/cm$^2$.

14. Apparatus for cycling an image on a thermoptic thin film comprising:
  a layer of thermoptic thin film;
  a layer of thermal insulating material disposed beneath said thermoptic thin film;
  means for inducing heat flow into said thermoptic thin film and said thermal insulating layer;
  means disposed beneath said layer of thermal insulating material for continuously extracting heat from said thermoptic thin film across said insulating layer to establish a thermal gradient, said means defining a conduit through which a refrigerated fluid is flowed; and
  means for regulating said heat inducing means to control the flow of heat into said thermoptic thin film to transition said thermoptic film between a bias temperature for image reception and maintenance and a temperature effective to erase images in said film.

15. The apparatus of claim 14 wherein said thermoptic thin film is a vanadium dioxide thin film.

16. The apparatus of claim 14 wherein said refrigerated fluid is methanol.

17. The apparatus of claim 14 wherein said refrigerated liquid is mercury.

18. The apparatus of claim 14 wherein said means for extracting heat includes high thermal conductivity material disposed adjacent said thermal insulating layer, said high thermal conductivity layer providing structural support.

19. The apparatus of claim 18 wherein said layer of high thermal conductivity material is copper.

20. The apparatus of claim 14 further comprising means for creating a turbulent flow of refrigerated fluid through said conduit.

21. The apparatus of claim 20 wherein said turbulent creating means includes a metallic mesh bonded to the interior surface of the conduit.

22. The apparatus of claim 20 wherein said turbulence creating means includes structure extending from the surface of said conduit into the flow.

23. The apparatus of claim 20 wherein said turbulence creating means includes structure for flowing said refrigerated fluid into said conduit perpendicular to the surface thereof.

24. Apparatus for cycling an image on a thermoptic thin film comprising;
  a layer of thermoptic thin film;
  a layer of thermal insulating material disposed beneath said thermoptic thin film;
  means for inducing heat flow into said thermoptic thin film and said thermal insulating layer;
  means disposed beneath said layer of thermal insulating material for extracting heat from said thermoptic thin film across said insulating layer to establish a thermal gradient, said means defining a conduit through which a refrigerated fluid is flowed; and
  means for regulating said heat inducing means to control the flow of heat into thermoptic thin film to transition said thermoptic film between a bias temperature for image reception and maintenance and a temperature effective to erase images in said film; wherein said thermal insulating material is quartz.

25. Apparatus for cycling an image on a thermoptic thin film: comprising:
  a layer of thermoptic thin film
  a layer of thermal insulating material disposed beneath said thermoptic thin film;
  means for inducing heat flow into said thermoptic thin film and said thermal insulating layer;
  means disposed beneath said layer of thermal insulating material for extracting heat from said thermoptic thin film across said insulating layer to establish a thermal gradient, said means defining a conduit through which a refrigerated fluid is flowed; and
  means for regulating said heat inducing means to control the flow of heat into said thermoptic thin film to transition said thermoptic film between a bias temperature for image reception and maintenance and a temperature effective to erase images in said film, wherein said inducing means includes a current generator and a layer of resistive material connected to said generator and disposed between said thermoptic thin film and said thermal insulating layer for generating heat in said thermoptic thin film and said insulating layer when a current is applied thereto.

26. The apparatus of claim 25 wherein said regulating means includes a sensor disposed adjacent said thermoptic thin film for sensing one of the temperature, reflectance or transmittance properties of said film, said sensor generating a feedback signal corresponding to one of the temperature, reflectance or transmittance properties sensed and a control circuit connected to said sensor and to said current generator for controlling the heat flow into said thermoptic thin film.

27. Apparatus for erasing and rebiasing a vanadium dioxide thin film having a bias temperature of about 65° C. and exhibiting hysteretic optical properties above a temperature of about 45° C., comprising:
  a layer of vanadium dioxide thin film;
  a layer of thermal insulating material having opposite upper and lower boundaries, the upper boundary of said insulating material being disposed adjacent said vanadium dioxide thin film;

a layer of resistive material disposed between said lower boundary of said thermal insulating material and said vanadium dioxide thin film;

a current generator connected to said resistive layer for generating a current in said layer and causing heat flow into said vanadium dioxide thin film and into said thermal insulating material;

a body formed of a high thermal conductivity material having the upper boundary thereof disposed beneath the lower boundary of said thermal insulating material, said thermal body defining a conduit, whereby a refrigerated fluid is flowed continuously therethrough for establishing a thermal gradient in the direction from said vanadium dioxide thin film toward said fluid;

a sensor disposed adjacent said vanadium dioxide thin film, said sensor generating a temperature signal corresponding to the temperature of said vanadium dioxide thin film; and control means connected to said current generator and to said sensor for intermittently varying and interrupting the current flow to said resistive layer in response to said temperature signal, said control means adapted to periodically interrupt the flow of current to said resistive layer to permit heat in said vanadium dioxide thin film to be dissipated until the temperature thereof is less than about 45° C., whereby images written in said vanadium dioxide thin film will be erased, said control means being responsive to said temperature signal from said sensor to permit sufficient current to be applied to said resistive layer to raise the temperature of the vanadium dioxide thin film to about 65° C., whereby said vanadium dioxide thin film will be rebiased when the temperature of said film is less than about 45° C.

* * * * *